E. L. CARSON.
NUT LOCK.
APPLICATION FILED AUG. 31, 1918.
1,334,887.
Patented Mar. 23, 1920.
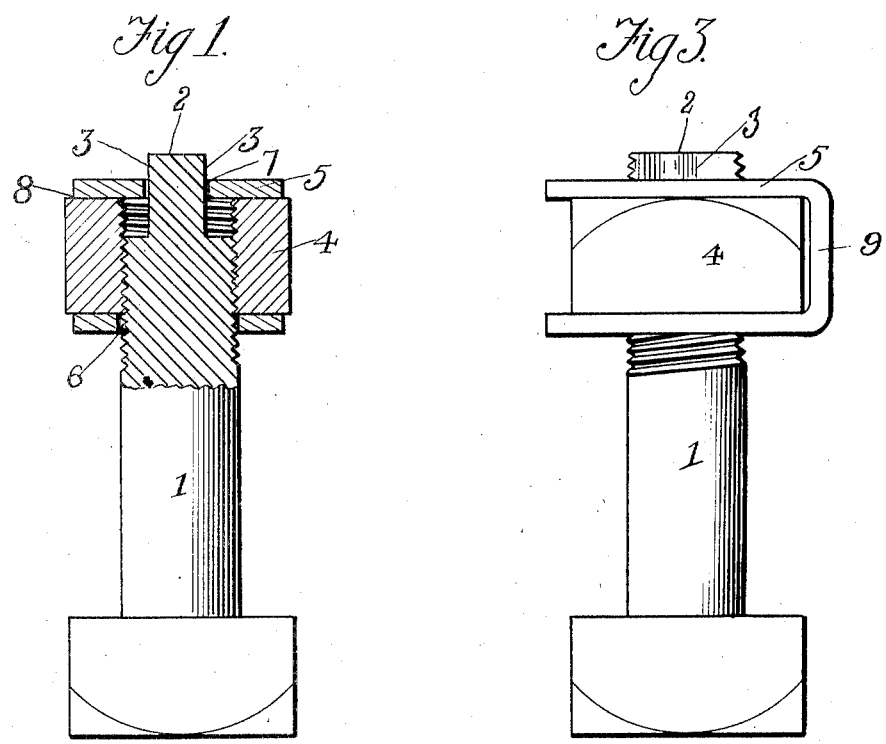
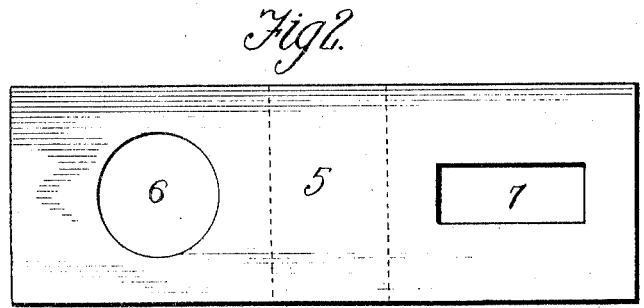
Witnesses
Everett Lloyd Jr.
J. C. Garner
Inventor
Earl L. Carson
By Victor J. Evans.
Attorney

UNITED STATES PATENT OFFICE.

EARL L. CARSON, OF MERLIN, OREGON.

NUT-LOCK.

1,334,887.  Specification of Letters Patent.  Patented Mar. 23, 1920.

Application filed August 31, 1918. Serial No. 252,198.

*To all whom it may concern:*

Be it known that I, EARL L. CARSON, a citizen of the United States, residing at Merlin, in the county of Josephine and State of Oregon, have invented new and useful Improvements in Nut-Locks, of which the following is a specification.

This invention relates to improvements in nut locks, the object of the invention being to provide an efficient and inexpensive device of this character by means of which a nut may be held against reverse movement upon the bolt whether the same is in engagement with the support or not.

With the above and other objects in view, the invention consists in the construction, combination and arrangement of devices hereinafter described and claimed.

In the accompanying drawings:

Figure 1 is an elevation, partly in section, of a bolt and nut provided with nut locking means constructed and arranged in accordance with my invention.

Fig. 2 is a detail plan of the locking washer showing the same in initial extended position.

Fig. 3 is a detail elevation of the bolt.

In accordance with my invention the bolt 1, which may otherwise be of any ordinary construction, is provided at the threaded end of a shank with an extension 2 which is flattened on opposite sides as at 3. The nut 4 is of usual construction. I also provide a washer 5 which is an oblong rectangular strip of metal which can be readily bent and which will remain in any position in which it may be placed. Near one end of the nut the washer is an opening 6 through which the bolt extends. The opposite end of the washer is provided with a longitudinal slot 7 the length of which exceeds the greatest width of the extension 2 of the bolt.

The washer is placed on the bolt and arranged under the nut and is then bent in substantially U form so as to also bear on the upper side of the nut as at 8. The opening 7 receives the flattened extension 2 of the bolt, the length of said slot exceeding the greatest width of said extension and thereby enabling the washer to be bent over the nut. By the engagement of the sides of the slot with the sides of the extension 2 the washer is prevented from turning on the bolt and the intermediate portion 9 of the washer, which is arranged at one side of the nut effectually prevents the nut also from turning on the bolt so that the nut is securely locked.

Having thus described my invention, I claim:

In combination with a bolt, and a nut thereon, said bolt having an extension at its threaded end flattened on opposite sides, a substantially U-shaped washer comprising parallel legs engaging opposite faces of the nut and a straight member connecting the parallel legs and engaging one side edge of the nut, said washer having an opening near its inner end through which the bolt passes and having a longitudinal slot near its outer end through which the flattened extension of the bolt passes, the length of said slot exceeding the greatest width of the said extension and thereby enabling the washer to be bent over the nut.

In testimony whereof I affix my signature.

EARL L. CARSON.